US009323056B2

(12) United States Patent
Williams

(10) Patent No.: US 9,323,056 B2
(45) Date of Patent: Apr. 26, 2016

(54) METHOD OF ALIGNING A HELMET MOUNTED DISPLAY

(75) Inventor: John Richard Williams, Maidstone (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 13/515,699

(22) PCT Filed: Dec. 17, 2010

(86) PCT No.: PCT/GB2010/052138
§ 371 (c)(1),
(2), (4) Date: Jun. 13, 2012

(87) PCT Pub. No.: WO2011/073682
PCT Pub. Date: Jun. 23, 2011

(65) Prior Publication Data
US 2012/0293395 A1 Nov. 22, 2012

(30) Foreign Application Priority Data

Dec. 17, 2009 (EP) ..................................... 09275125
Dec. 17, 2009 (GB) ................................... 0922022.9

(51) Int. Cl.
G02B 27/01 (2006.01)
G06F 3/01 (2006.01)
G01S 5/16 (2006.01)

(52) U.S. Cl.
CPC ............... G02B 27/017 (2013.01); G01S 5/163 (2013.01); G06F 3/012 (2013.01); G02B 2027/0187 (2013.01)

(58) Field of Classification Search
CPC ............. G02B 27/017; G02B 27/0093; G02B 2027/0187; F41G 3/225; G06F 3/012; G01S 5/163
USPC .............................................................. 345/8
See application file for complete search history.

(56) References Cited

U.S. PATENT DOCUMENTS 3,915,548 A * 10/1975 Opittek .................. G02B 27/01 345/7
4,647,967 A * 3/1987 Kirschner et al. ............ 348/115
(Continued)

FOREIGN PATENT DOCUMENTS

WO WO 2004/113991 A2 12/2004

OTHER PUBLICATIONS

Tuceryan, M. et al., "Single point active alignment method (SPAAM) for optical see-through HMD calibration for AR", Augmented Reality (2000), Proceedings of IEEE and ACM International Symposium on Munich, Germany Oct. 5-6, 2000, pp. 149-158.
Hua, Hong et al., "A systematic framework for on-line calibration of a head-mounted projection display for augmented-reality systems", Journal of the SID (Nov. 15, 2007), pp. 905-913.
Genc, Yakup et al., "Practical Solutions for Calibration of Optical See-Through Devices", Proceedings of the International Symposium on Mixed and Augmented Reality (Sep. 30-Oct. 1, 2002), pp. 169-175.

(Continued)

Primary Examiner — Temesgh Ghebretinsae
Assistant Examiner — Michael J Jansen, II
(74) Attorney, Agent, or Firm — Scully, Scott, Murphy & Presser, P.C.

(57) ABSTRACT

A method and system of aligning a helmet mounted display mounted to a helmet is disclosed. A method may comprise aligning a first and a second helmet mounted display guide symbol with a reference direction, respectively; selecting the alignment of the first and second helmet mounted display guide symbol with the reference direction, respectively; aligning a first and a second stabilised guide symbol, starting at positions of the aligned first and second symbols, respectively, with the reference direction, the first and second stabilised symbols being stabilised to reduce the movement of the stabilised symbol with respect to the reference direction in response to movements of the head of the user; selecting the alignment of the first and second stabilised guide symbol with the reference direction, respectively; determining a relative position and orientation between the helmet and the display according to the positions and orientations of the helmet at the alignments.

15 Claims, 2 Drawing Sheets

(56) References Cited

U.S. PATENT DOCUMENTS

| | | | |
|---|---|---|---|
| 4,722,601 A * | 2/1988 | McFarlane | F41G 3/225 345/8 |
| 4,977,398 A | 12/1990 | Pleva et al. | |
| 5,270,688 A | 12/1993 | Dawson et al. | |
| 5,721,792 A | 2/1998 | Thompson | |
| 6,377,401 B1 * | 4/2002 | Bartlett | 359/630 |
| 7,046,215 B1 * | 5/2006 | Bartlett | 345/8 |
| 8,120,857 B2 * | 2/2012 | Hedges et al. | 359/630 |
| 2010/0091377 A1 * | 4/2010 | Hedges et al. | 359/630 |
| 2010/0109976 A1 * | 5/2010 | Gilbert et al. | 345/8 |
| 2012/0120482 A1 * | 5/2012 | Hedges et al. | 359/353 |

OTHER PUBLICATIONS

International Search Report dated May 18, 2011 issued in PCT/GB2010/052138.

Extended European Search Report dated Mar. 15, 2010 issued in EP 09275125.4.

UK Search Report dated Jun. 21, 2011 issued in GB1103987.2.

International Preliminary Report on Patentability and Written Opinion, dated Jun. 28, 2012 from related International Application No. PCT/GB2010/052138.

* cited by examiner

METHOD OF ALIGNING A HELMET MOUNTED DISPLAY

The present invention relates to a method of aligning a helmet mounted display. The present invention further relates to a helmet mountable display system.

A large number of helmet mounted display (HMD) systems for use on aircraft incorporate a helmet tracking system (HTS) which monitors the orientation of the helmet within the aircraft. This improves the capabilities of the HMD in the following ways:

- HMD symbols can be stabilised with respect to head movement so that they overlay specified points relative to the aircraft or relative to the ground.
- HMD symbology can be used to cue a user to a particular viewing direction relative to the aircraft or relative to the ground.
- Fixed HMD symbols can be used to designate outside points or to direct aircraft sensors using head movement.

In order to realise these capabilities, it is necessary to know the alignment of the HMD within the helmet frame of reference as reported by the HTS, so that display symbols can be accurately positioned on the display. A problem with some types of HMDs however, is that the alignment of the HMD with the helmet cannot be determined prior to use and may even change during use. For example, in some systems the display is injected into the field of view of night vision goggles (NVG). The mounting of NVGs is normally such that the NVGs can be positioned at varying angles relative to the helmet and may be repositioned from time to time by a single user, leading to unpredictable changes in the HMD alignment. In addition to NVGs there are other types of HMDs which clip onto the helmet and/or which allow the user to adjust their physical alignment, again leading to unpredictable alignment with the helmet.

The solution to the HMD alignment problem is boresighting. This is a procedure performed by the user in which HMD symbology is lined up with known fiducial references installed in the aircraft. The combination of HMD symbol positions, known fiducial alignment and HTS-monitored helmet orientation is used to calculate the alignment of the HMD. Generally, the boresighting procedure is performed by aircrew at the start of a mission and may be repeated several times during a mission. It is therefore important that boresighting be a quick and easy procedure, taking no more than a few seconds.

Current methods for boresighting require the user to line up HMD symbology in three axes, namely azimuth, elevation and roll, simultaneously. This requires the use of a horizontally or vertically extended fiducial, such as a cross, to provide the roll reference. In these circumstances, the user is typically required to align a first symbol at the intersection of the lines forming the cross and simultaneously align a second symbol upon a particular line forming the cross to provide the alignment along the roll coordinate. Typically, the reference is provided by two so-called boresight reticule units (BRUs), however if two BRUs are used, they must be accurately installed to be visible to the same eye at the same time. In any event, it is difficult for the user to line up fixed HMD symbology with fiducial reference in all three axes simultaneously using head movement, particularly when airborne.

An aircraft, and particularly a rotary wing aircraft, is subject to movement and vibration during flight and also prior to take off during engine operation. Such movement and vibration inhibits the ability of an aircraft occupant to keep their head still sufficiently to make the small head movements required for successful alignment. It is in any case difficult, even without, aircraft movement and vibration to carry out the fine head head movements which are required.

We have now devised an improved method of aligning a helmet mounted display.

In accordance with the present invention as seen from a first aspect, there is provided a method of aligning a helmet mounted display mounted to a helmet worn by a user, the method comprising the steps of: aligning a first helmet mounted display guide symbol with a reference direction; selecting the alignment of the first helmet mounted display guide symbol with the reference direction; aligning a first stabilised guide symbol with a reference direction, the first stabilised symbol being stabilised to reduce the movement of the stabilised symbol with respect to the reference direction in response to movements of the head of the user; selecting the alignment of the first stabilised guide symbol with the reference direction; aligning a second helmet mounted display guide symbol with the reference direction; selecting the alignment of the second helmet mounted display guide symbol with the reference direction; aligning a second stabilised guide symbol with a reference direction, the second stabilised symbol being stabilised to reduce the movement of the stabilised symbol with respect to the reference direction in response to movements of the head of the user; selecting the alignment of the second stabilised display guide symbol with the reference direction.

The method thus offers the advantages over existing boresighting methods that only a single line of sight fiducial reference is needed and that there is no requirement for a user to align the helmet mounted display along a roll coordinate.

The alignment of the first and second guide symbols with the reference direction is preferably performed by a user by positioning the helmet upon the users' head and moving the users' head to move the display.

The method allows adjusting the alignment of the first and the second stabilised symbols with the reference direction, to more accurately align them with the reference direction.

Preferably, the adjustment is performed using a manual control, such as a joystick. Alternatively, the adjustment is performed by the user by moving the users' head to effect movement of the display.

In a further alternative, the adjustment of one of the first and second stabilised symbols is preferably performed using a manual control and the adjustment of other of the first and second stabilised symbols is performed by the user by moving the users' head to effect movement of the display.

The method preferably further comprises controlling the sensitivity to movement of the stabilised symbols with respect to movements of the joystick and/or head movements of the user. The sensitivity control preferably provides for a scaled movement of the stabilised symbols with respect to a movement of the joystick and/or user's head. It is envisaged that the sensitivity control will enable a user to accurately align the stabilised symbols with relatively coarse head movements.

In accordance with the present invention as seen from a second aspect, there is provided a helmet mountable display system, the system comprising: a helmet mountable display for viewing by a user wearing the helmet; a helmet tracking system for tracking changes in position and orientation of the helmet; means for indicating a reference direction; a display control for controlling the display of images on the control; and an input means for receiving an input from the viewer; wherein the display control is configured for: generating a first display guide symbol on the display for alignment by the user with the reference direction, for receiving from the input means an input by the user for selecting said alignment and for determining a first position and orientation of the helmet at said alignment; generating a first stabilised symbol for alignment by the user with the reference direction and reducing the movement of the stabilised symbol with respect to the reference direction in response to movements of the head of the user, for receiving from the input means an input by the user for selecting said alignment and for determining a second position and orientation of the helmet at said alignment; generating a second helmet mounted display guide symbol for alignment by the user with the reference direction, for receiving from the input means an input by the user for selecting said alignment and for determining a third position and orientation of the helmet; generating a first stabilised symbol for alignment by the user with the reference direction and reducing the movement of the stabilised symbol with respect to the reference direction in response to movements of the head of the user, for receiving from the input means an input by the user for selecting said alignment and for determining a fourth position and orientation of the helmet; and determining a relative position and orientation between the helmet and the display mounted to the helmet according to the positions and orientations of the helmet at said alignments.

Preferably, the means for indicating a reference direction is arranged to generate a reference symbol along a known line of sight. The reference symbol is preferably generated using a boresight reticule unit. Alternatively, or in addition thereto, the reference symbol is generated using a head up display which is arranged to display reference symbology.

Preferably, the system further comprises means for adjusting the alignment of symbols with the reference direction.

Preferably, the system further comprises means for selecting the alignment of symbols with the reference direction. Preferably, the system further comprises means for confirming the alignment of symbols with the reference direction.

Embodiments of the present invention will now be described by way of example only and with reference to the accompanying drawings, in which.

Figure 1:
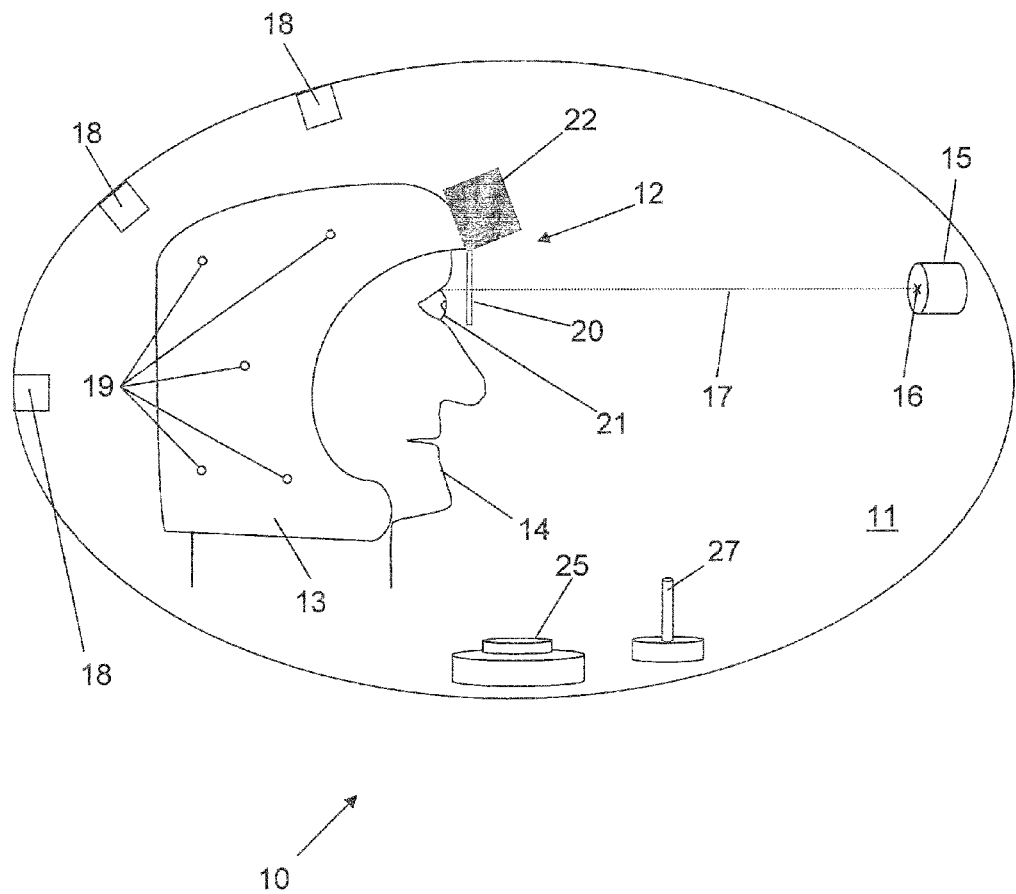
FIG. 1 is a schematic illustration of a helmet mountable display mounted upon a helmet, showing the fiducial reference.

Referring to FIG. 1, there is illustrated a helmet mountable display system 10 according to an embodiment of the present invention arranged, for example, within a cockpit 11 of an aircraft (not shown). The display unit 12 is mountable upon a helmet 13 for a pilot 14 for example, and a boresight reticule unit 15 for example, is disposed at a known position and orientation within the cockpit 11 and is arranged to provide a reference symbol 16 along a known line of sight 17 within the cockpit 11. The cockpit 11 comprises a plurality of sensors and/or cameras 18 disposed therein for monitoring the position of light emitting diodes (LEDs) 19 positioned upon the exterior of the helmet 13. The LEDs 19 are positioned at known locations upon the helmet 13, such that the sensors and/or cameras 19 positioned within the cockpit 11 can monitor and track the position and orientation of the LEDs 19 and thus the helmet 13, within the cockpit 11. It is to be appreciated however, that various other helmet tracking arrangements, such as a magnetic, acoustic and inertial tracking arrangements would provide an equal substitute for this optical tracking arrangement.

The display unit 12 is detachably secured to the helmet 13 or may be arranged to pivot thereon, for example, between at least two lockable positions and comprises a field of view, for example a display screen 20 which is arranged to extend in front of a pilots' eye 21. The unit 12 further comprises an image generating and projecting device 22 for generating and projecting symbols into the field of view of the pilot, to inform a pilot 14 for example, of flight information and to aid a pilot 14 in flying an aircraft (not shown). The symbols are focussed substantially at optical infinity upon the screen 20 so that the symbols remain in view of the pilot while the pilot is looking out of the cockpit, for example.

Once the helmet 13 has been suitably positioned upon the pilots head, and the display unit 12 secured in place such that the display screen 20 extends in front of the pilots' eye 21, the pilot 14 then proceeds to align the display unit 12 with respect to the helmet 13 so that symbols which become displayed on the screen 20 are displayed at accurately known positions. That is, the helmet is tracked and therefore the position of the helmet in the cockpit is known. However, the position of the HMD relative to the helmet is not known. Accordingly, and as explained in detail below, the present arrangement determines the position of the HMD relative to the cockpit and therefore the Helmet tracking system can track movement of the HMD.

Figure 2:
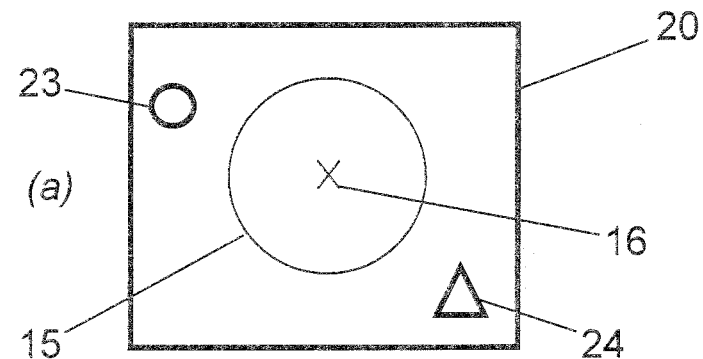
FIG. 2a is a pilots view of the guide symbols presented on the display illustrated in FIG. 1.
FIG. 2b is a pilots view of the first guide symbol and first stabilised symbol presented on the display illustrated in FIG. 1; and, FIG. 2c is a pilots view of the second guide symbol and second stabilised symbol presented on the display illustrated in FIG. 1.
Figure 2:
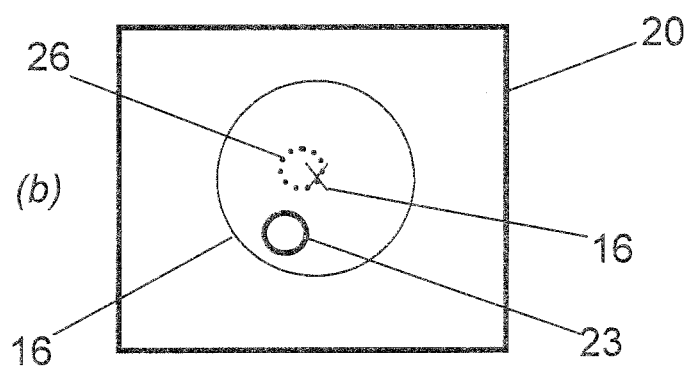
Figure 2:
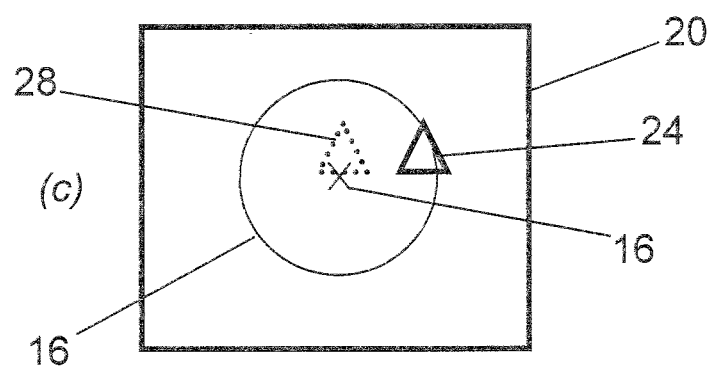

Referring to FIG. 2 of the drawings, the display unit 12 is arranged to display a first and second guide symbol 23, 24 at separated and fixed positions upon the screen 20 and the pilot 14 then uses head movement to align the first guide symbol 23 with the reference symbol 16 generated by the boresight reticule unit 15. The pilot 14 then selects the aligned position by pressing a button 25 for example, disposed within the cockpit 11. During this alignment, the system 10 records the tracked movement and orientation of the helmet 13 by monitoring the movement and orientation of LEDs 19 on the helmet 13. The pilot 14 then uses head movement to align the second guide symbol 24 with the reference symbol 16 generated by the boresight reticule unit 15 and similarly selects the aligned position by pressing the button 25 disposed within the cockpit 11. During this subsequent head movement, the system 10 further monitors and tracks the movement and orientation of the helmet 13 within the cockpit 11.

The monitored position and orientation of the helmet 13 at each selected alignment, together with the known line of sight 17 provided by the boresight reticule unit 15, enables a processor of the system 10, which may be bespoke or part of the flight control computer, to calibrate the alignment of the helmet mounted display 12 with respect to the helmet 13. According to a first embodiment of the present invention, a first stabilised symbol 26 is generated on the screen 20 upon selecting the alignment of the first guide symbol 23 with the reference symbol 16, and is arranged to remain in the selected position, with respect to the cockpit 11, of the first guide symbol 23. While maintaining an approximate alignment of the first guide symbol 23 with the reference symbol 16, the pilot 14 uses a 2-axis manual control such as a joystick 27, to adjust the position of the first stabilised symbol 26 until it becomes more accurately aligned with the reference symbol 16. The pilot 14 then confirms the alignment by pressing the button 25 again, for example.

In more detail and with particular reference to FIG. 2b, the first guide symbol 23 is generated having a fixed position on the display. The user 14 moves the guide symbol by head movements so that it is over the fiducial reference 16 and then presses the button a first time with the helmet in a first position. The system calculates an initial line of sight assuming at this stage that the guide symbol is accurately positioned over the fiducial reference even though in practice it is difficult for a user to line up the guide symbol accurately by head movement alone, particularly when aircraft is subject to vibration during flight. The system determines the helmet position when the button is pressed and the guide symbol is approximately aligned with the fiducial reference. An approximated relative position of the helmet and the display may then be calculated.

The system generates the first stabilised symbol 26 on the display approximately at the position of the display as the first guide symbol. The display of the first stabilised symbol 26 allows more accurate determination of the relative position between the display and the helmet. When the first stabilised symbol is displayed, the user continues to maintain the first guide symbol approximately over the fiducial reference 16 by keeping head movements to a minimum, whilst guiding the first stabilised symbol onto the fiducial reference using a manual control. The first guide symbol 23 is fixed in position on the display so that head movements will cause the first guide symbol to move relative to the fiducial reference. However, the first stabilised symbol 26 is not fixed on the display and the system changes its position on the display to compensate for any head movements so that the stabilised symbol can be aligned with the fiducial reference generally independent of head movements. When the first stabilised symbol is aligned with the fiducial reference, the user 14 presses the button a second time with the helmet in a second position.

Since movement of the helmet is tracked, the first and second positions of the helmet can be determined by the system. The system can then determine how much stabilisation was required during alignment of the first stabilised symbol with the fiducial reference which is then used in combination with the fine adjustment of the stabilised symbol over the fiduciary reference to calculate accurately the relative position of the display and the helmet. In other words, the movement of the head during fine adjustment is nulled out so that alignment of the display with the fiducial reference can be determined independent of head movement.

In this first stabilised method, the first stabilised symbol can be fully or partially stabilised. With partial stabilisation, head movement during alignment will be represented by some but reduced movement of the first stabilised symbol relative to the fiducial reference. In certain circumstances, such reduced movement may be sufficient to allow a user to correctly align the first stabilised symbol with the fiducial reference.

Similarly, as shown in FIG. 2c, a second stabilised symbol 28 is generated on the screen 20 upon selecting the alignment of the second guide symbol 24 with the reference symbol 16, and is arranged to remain in the selected position, with respect to the cockpit 11, of the second guide symbol 24. While maintaining an approximate alignment of the second guide symbol 24 with the reference symbol 16 generated by the boresight reticule unit 15, the pilot 14 uses the 2-axis manual control, such as the joystick 27, to adjust the position of the second stabilised symbol 28 until it becomes more accurately aligned with the reference symbol 16. The pilot 14 then confirms the alignment by pressing the button 25 again, for example.

Alignment of the second guide symbol 24 with the fiducial reference 16 followed by alignment of the second stabilised symbol 28 is performed in a similar way to the process described above with reference to FIG. 2b. Accordingly, once both first and second stabilised symbols 26, 28 have been aligned the relative position of the display and the helmet can be determined in azimuth, elevation and roll.

The system 10 records the confirmed stabilised display line of sight of the first and second stabilised symbols 26, 28 and then uses this information, together with the monitored position of the helmet 13 as determined at the selected alignment of the first and second guide symbols 23, 24, to more accurately calibrate the alignment of the helmet mounted display 12 with respect to the helmet 13.

According to a second embodiment of the present invention, the position of the first and second stabilised symbols 26, 28 upon the screen 20 is adjustable using head movement alone, without any requirement for a separate manual control, such as the joystick 27. In this embodiment, the pilot 14 for example, controls the sensitivity to movement of the stabilised symbols 26, 28 with respect to corresponding head movement, such that relatively large, erratic head movements produce small, smooth movements of the stabilised symbols 26, 28, thereby making it easier to more accurately align the stabilised symbol 26, 28 with the reference symbol 16. It is envisaged that this sensitivity control may be predetermined or adjustable so that a pilot 14 for example, may be able to vary the sensitivity to suit a particular environment.

Upon positioning the stabilised symbols 26, 28 more accurately over the reference, the pilot 14 confirms the more accurate alignment by pressing the button 25, for example. The system subsequently records the confirmed line of sight of the first and second stabilised symbols 26, 28 and uses this information, together with the monitored position of the helmet 13 as determined at the selected alignment of the first and second guide symbols 23, 24, to more accurately calibrate the alignment of the helmet mounted display 12 with respect to the helmet 13.

In more detail, and referring first to FIG. 2b, the first guide symbol 23 is generated having a fixed position on the display 20. The user moves the guide symbol by head movements so that it is over the fiducial reference 16 and then presses the button a first time with the helmet in a first position. The system calculates an initial line of sight assuming at this stage that the guide symbol is accurately positioned over the fiducial reference even though in practice it is difficult for a user to line up the guide symbol accurately by head movement alone, particularly when aircraft is subject to vibration during flight. The system determines the helmet position when the button is pressed and the guide symbol is approximately aligned with the fiducial reference. An approximated relative position of the helmet and the display may then be calculated.

The system generates the first stabilised symbol 26 on the display approximately at the position of the display as the first guide symbol 23. The display of the first stabilised symbol allows more accurate determination of the relative position between the display and the helmet. When the first stabilised symbol is displayed, the first guide symbol may be removed from the display or alternatively the first guide symbol may simply become the first stabilised symbol. Whilst the first guide symbol 23 is fixed in position on the display so that head movements will cause commensurate movement of the first guide symbol relative to the fiducial reference, the first stabilised symbol 26 is not fixed on the display and the system changes the position on the display to reduce the affect of head movements. That is, the affect of head movements are geared down so that for any given head movement the first stabilised symbol is moved across the display to produce a commensurately reduced movement of the first guide symbol relative to the fiducial reference 16. When the first stabilised symbol is aligned with the fiducial reference, the user presses the button a second time with the helmet in a second position.

Since movement of the helmet is tracked, the first and second positions of the helmet can be determined by the system. The system can then determine how much stabilisation was required during alignment of the first stabilised symbol 26 with the fiducial reference 16 which is then used in combination with the fine adjustment of the stabilised symbol over the fiduciary reference to calculate accurately the relative position of the display and the helmet. In other words, the movement of the head during fine adjustment is nulled out so that alignment of the display with the fiducial reference can be determined independent of head movement.

According to a third embodiment of the present invention the position of the first and second stabilised symbols 26, 28 upon the screen 20 is adjustable using either joystick movement and head movement, such that a pilot 14, may choose which of the joystick 27 or head movement to use in aligning the stabilised symbols 26, 28. Moreover, is envisaged that the sensitivity control (not shown) may be applied to the joystick in addition to movements of the pilots head, for example.

From the foregoing therefore, it is evident that the method and system of the present invention provide for a rapid alignment of helmet mountable display with respect to a helmet, by eliminating the requirement to align the display in 3-axes simultaneously and to compensate for undesirable head movements during alignment.

The invention claimed is:

1. A method of aligning a helmet mounted display, mounted to a helmet worn by a user, the method comprising the steps of:
displaying a first guide symbol at a fixed position in the helmet mounted display such that the first guide symbol moves relative to the user's view of an external scene with movement of a head of the user;
aligning the displayed first guide symbol with an externally visible reference direction by head movement;
receiving a input by the user as confirmation when the first guide symbol is approximately aligned with the externally visible reference direction;
generating a first stabilised guide symbol for display in the helmet mounted display at an initial position coincident with the confirmed position of alignment of the first guide symbol with respect to the externally visible reference direction, such that the externally visible relative position of the first stabilised guide symbol and the externally visible reference direction appears in the helmet mounted display to remain substantially unchanged by movement of the head of the user;
moving the position of the first stabilised guide symbol as it appears in the helmet mounted display relative to the externally visible reference direction to align the first stabilised guide symbol with the externally visible reference direction while maintaining approximate alignment of the first guide symbol with the externally visible reference direction;
receiving a input by the user as confirmation of alignment of the first stabilised guide symbol with the externally visible reference direction;
displaying a second guide symbol at a fixed position in the helmet mounted display, separated from the position of the first guide symbol such that the second guide symbol moves relative to the user's view of the external scene with movement of the head;
aligning the displayed second guide symbol with the externally visible reference direction by head movement;
receiving a input by the user as confirmation when the second guide symbol is approximately aligned with the externally visible reference direction;
generating a second stabilised guide symbol for display in the helmet mounted display at an initial position coincident with the confirmed position of alignment of the second guide symbol with respect to the externally visible reference direction, such that the relative position of the second stabilised guide symbol and the externally visible reference direction appears in the helmet mounted display to remain substantially unchanged by movements of the head of the user;
moving the position of the second stabilised guide symbol as it appears in the helmet mounted display relative to the externally visible reference direction to align the second stabilised guide symbol with the externally visible reference direction while maintaining approximate alignment of the second guide symbol with the externally visible reference direction;
receiving a input by the user as confirmation of alignment of the second stabilised guide symbol with the externally visible reference direction; and
determining, using helmet orientation data captured at the receiving the confirmation and aligning steps, the direction of the user's line of sight through the helmet mounted display relative to the orientation of the helmet and thereby the alignment of the helmet mounted display with the helmet.

2. The method according to claim 1, wherein movement of the helmet during alignment is tracked by a helmet mounted tracking system thereby determining the orientations of the helmet at the respective confirmations of alignments so that the relative orientation of the helmet and user's line of sight can be determined.

3. The method according to claim 1, wherein alignment of the first and second stabilised guide symbols is performed by operating a manual control.

4. The method according to claim 3, further comprising controlling the sensitivity to movement of the first and second stabilised guide symbols with respect to movements of the manual control.

5. The method according to claim 1, wherein alignment of the first and second stabilised guide symbols is performed by movement of the helmet.

6. The method according to claim 5, further comprising controlling the sensitivity to movement of the first and second stabilised guide symbols with respect to head movements of the user.

7. The method according to claim 1, wherein alignment of one of the first and second stabilised guide symbols is performed by operating a manual control and alignment of the other of the first and second stabilised guide symbols is performed by movement of the helmet.

8. The method according to claim 7, further comprising controlling the sensitivity to movement of the first and second stabilised guide symbols with respect to movements of the manual control or helmet.

9. The method according to claim 8, wherein the sensitivity control provides for a scaled movement of the first and second stabilised guide symbols with respect to a movement of the manual control or helmet.

10. A helmet mountable display system, the system comprising:
a helmet mountable display for viewing by a user wearing the helmet;
a helmet tracking system for tracking changes in orientation of the helmet;
means for indicating an externally visible reference direction;

a display control for controlling the display of images on the helmet mountable display; and an input means for receiving an input from the user;

wherein the display control is configured for: displaying a first display guide symbol at a fixed position on the helmet mountable display such that the first display guide symbol moves relative to the user's view of an external scene with the movement of the head of the user aligning the displayed first display guide symbol with the externally visible reference direction according to the movement of the head, receiving from the input means an input by the user when the first display guide symbol is approximately aligned with the externally visible reference direction;

generating a first stabilised symbol in the helmet mountable display at an initial position coincident with the inputted alignment of the first display guide symbol with respect to the externally visible reference direction such that the relative position of the first stabilised symbol and the externally visible reference direction appears in the helmet mountable display to remain substantially unchanged by movements of the head of the user;

moving the position of the first stabilised symbol as it appears in the helmet mountable display relative to the externally visible reference direction to align the first stabilised symbol with the externally visible reference direction while maintaining approximate alignment of the first display guide symbol with the externally visible reference direction;

displaying a second display guide symbol at a fixed position in the helmet mountable display separated from the position of the helmet mountable display of the first display guide symbol, such that the second display guide symbol moves relative to the user's view of the external scene with the movement of the head, aligning the displayed second display guide symbol with the externally visible reference direction according to the movement of the head;

receiving from the input means an input by the user when the first display guide symbol is approximately aligned with the externally visible reference direction generating a second stabilised symbol in the helmet mountable display at an initial position coincident with the input alignment of the second display guide symbol with respect to the externally visible reference direction such that the relative position of the second stabilised symbol and the externally visible reference direction appears in the helmet mountable display to remain substantially unchanged by movements of the head of the user;

moving the position of the second stabilised symbol as it appears in the helmet mountable display relative to the externally visible reference direction to align the second stabilised symbol with the externally visible reference direction while maintaining at least approximate alignment of the second display guide symbol with the externally visible reference direction and determining, using helmet orientation data captured during the alignments and receiving input, the direction of the user's line of sight though the helmet mountable display relative to the orientation of the helmet thereby the alignment of the helmet mountable display with the helmet.

11. The system according to claim 10, wherein the display control is configured for receiving the movement of the helmet from the helmet tracking system and for moving the first and second stabilised symbols on the helmet mounted display to compensate for the helmet movement during their respective alignments which reduces the movement of the first and second stabilised symbols.

12. The system according to claim 10, comprising a manual control operable by the user for aligning the first and the second stabilised symbols with the externally visible reference direction.

13. The system according to claim 11, comprising a sensitivity control operable by the user for controlling the amount of reduction performed by the display control on the first and the second stabilised symbols during alignment.

14. The system according to claim 10, wherein the means for indicating the externally visible reference direction is arranged to generate an externally visible reference symbol along a known line of sight.

15. The system according to claim 14, wherein the externally visible reference symbol is generated using a boresight reticle unit.

* * * * *